(12) United States Patent
Hinami et al.

(10) Patent No.: US 8,825,318 B2
(45) Date of Patent: Sep. 2, 2014

(54) CONTROL DEVICE AND CONTROL METHOD FOR AUTOMATIC TRANSMISSION

(75) Inventors: Takashige Hinami, Machida (JP); Masaki Watanabe, Machida (JP); Yasutaka Kawamura, Atsugi (JP); Kazuya Murota, Tokyo (JP); Hirofumi Michioka, Fujisawa (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 295 days.

(21) Appl. No.: 13/019,697

(22) Filed: Feb. 2, 2011

(65) Prior Publication Data

US 2011/0230285 A1    Sep. 22, 2011

(30) Foreign Application Priority Data

Mar. 19, 2010 (JP) ................................. 2010-064661

(51) Int. Cl.
  *G06F 19/00* (2011.01)
  *F16H 61/00* (2006.01)
  *F16H 59/00* (2006.01)

(52) U.S. Cl.
  USPC .................................. 701/51; 474/17; 474/22

(58) Field of Classification Search
  USPC .............. 701/51; 474/18, 17, 22; 477/98, 156
  See application file for complete search history.

(56) References Cited

U.S. PATENT DOCUMENTS

| | | | |
|---|---|---|---|
| 3,620,646 A | | 11/1971 | Stevenson |
| 4,519,790 A | * | 5/1985 | Yamamuro et al. ............. 474/18 |
| 4,736,301 A | * | 4/1988 | Osanai ............................ 701/51 |
| 5,261,295 A | * | 11/1993 | Iwanaga et al. ................. 477/98 |
| 5,700,226 A | | 12/1997 | Droste |
| 6,168,547 B1 | * | 1/2001 | Kawamura ..................... 477/156 |
| 7,112,154 B2 | | 9/2006 | Wakahara et al. |
| 2004/0162183 A1 | * | 8/2004 | Wakahara et al. .............. 477/18 |

FOREIGN PATENT DOCUMENTS

| | | |
|---|---|---|
| EP | 1 406 032 A2 | 4/2004 |
| FR | 2 443 598 A1 | 7/1980 |
| JP | 03-265753 A | 11/1991 |
| JP | 2002-340160 A | 11/2002 |
| JP | 2004-183746 A | 7/2004 |

OTHER PUBLICATIONS

Karim Nice, "How Torque Converters Work", Jan. 12, 2009, http://web.archive.org/web/20090112095220/http://auto.howstuffworks.com/auto-parts/towing/towing-capacity/information/torque-converter.htm/printable.*
A. Nakamura, U.S. PTO Office Action, U.S. Appl. No. 13/494,367, dated Apr. 9, 2013, 15 pages.
Arata Nakamura, U.S. PTO Notice of Allowance, U.S. Appl. No. 13/494,367, dated Jul. 17, 2013, 13 pages.

\* cited by examiner

*Primary Examiner* — Calvin Cheung
*Assistant Examiner* — Aaron L Troost
(74) *Attorney, Agent, or Firm* — Foley & Lardner LLP

(57) ABSTRACT

In a control device for an automatic transmission having a flow control mechanism that causes a part of a working oil discharged from a mechanical oil pump to flow into the mechanical oil pump when a differential pressure between an upstream side and a downstream side of a narrowed portion increases beyond a predetermined value, the narrowed portion being provided in a discharge passage through which the working oil discharged from the mechanical oil pump flows, a line pressure is raised when an oil temperature of the working oil is equal to or higher than a predetermined oil temperature and an engine torque is equal to or smaller than a predetermined engine torque.

9 Claims, 8 Drawing Sheets

CONTROL DEVICE AND CONTROL METHOD FOR AUTOMATIC TRANSMISSION

FIELD OF THE INVENTION

This invention relates to a control device and a control method for an automatic transmission.

BACKGROUND OF THE INVENTION

JP2004-183746A discloses a conventional device in which a flow control valve is provided in a discharge side flow passage of an oil pump.

In JP2004-183746A, a spool that functions as the flow control valve includes a orifice, and in accordance with a differential pressure between an upstream side and a downstream side of the orifice, the spool moves, thereby adjusting an opening area of a drain hole that is provided in a side face of the spool so as to communicate with an intake passage of the oil pump. The spool is normally biased to close the drain hole by a spring or the like, but when the differential pressure between a pressure on the upstream side of the orifice and a pressure on the downstream side of the orifice exceeds a biasing force of the spring, the spool moves so as to open the drain hole.

By using this flow control valve to return working oil discharged from the oil pump to the intake passage of the oil pump, a reduction is achieved in an intake amount of working oil intermixed with air having low compressibility, and as a result, a discharge efficiency of the oil pump improves.

However, when an increase occurs in an amount of air mixed into working oil suctioned into the oil pump from an oil pan, a discharge pressure of the oil pump pulsates, leading to pulsation in the differential pressure. When this pulsation causes the differential pressure to decrease in a case where the drain hole is required to be in a communicative state, the spool may be moved so as to close the drain hole by the biasing force of the spring, and as a result, the drain hole may enter a non-communicative state.

In such cases, working oil intermixed with air having low compressibility is suctioned into the oil pump, leading to an increase in a volume of air contained in the oil in the oil pump, and as a result, the discharge pressure of the oil pump decreases further, making it impossible to supply an oil pressure required by a transmission or the like, for example.

In response to this problem, JP2002-340160A discloses a device that determines the amount of air mixed into the working oil and increases a rotation speed of an electric oil pump in consideration of a reduction in the discharge pressure caused by the intermixed air.

SUMMARY OF THE INVENTION

An electric oil pump is driven by a motor, and therefore the rotation speed of the electric oil pump can be controlled freely. However, in the case of a mechanical oil pump driven by rotation generated by an engine or the like, for example, it is difficult to control the rotation speed of the mechanical oil pump individually, and it is therefore difficult to prevent the reduction in discharge pressure described above.

This invention has been designed to solve these problems, and an object thereof is to suppress a reduction in a discharge pressure of a mechanical oil pump caused by the intermixing of air into working oil.

A control device for an automatic transmission according to an aspect of this invention controls the automatic transmission which has a mechanical oil pump driven by a rotation of an engine transmitted thereto, an intake passage through which a working oil suctioned into the mechanical oil pump flows, a discharge passage having a narrowed portion, through which the working oil discharged from the mechanical oil pump flows, a connecting passage that connects the intake passage to the discharge passage on an upstream side of the narrowed portion in a flow direction of the working oil while bypassing the mechanical oil pump, and a flow control mechanism including a spool that sets the connecting passage in a communicative state when a differential pressure between an oil pressure on the upstream side of the narrowed portion in the flow direction of the working oil and an oil pressure on a downstream side of the narrowed portion in the flow direction of the working oil exceeds a predetermined value and sets the connecting passage in a non-communicative state when the differential pressure is equal to or lower than the predetermined value. The control device includes an oil temperature detecting unit which detects an oil temperature of the working oil, an engine torque calculating unit which calculates an engine torque, a line pressure setting unit which sets a line pressure to be higher as the engine torque increases, and a line pressure correcting unit which raises the line pressure above the line pressure set by the line pressure setting unit when the oil temperature is equal to or higher than a predetermined oil temperature at which the connecting passage switches from the communicative state to the non-communicative state due to air mixed into the working oil and the engine torque is equal to or smaller than a predetermined engine torque at which the connecting passage switches from the communicative state to the non-communicative state due to the air mixed into the working oil.

A control method for an automatic transmission according to another aspect of this invention is used to control the automatic transmission which has a mechanical oil pump driven by a rotation of an engine transmitted thereto, an intake passage through which a working oil suctioned into the mechanical oil pump flows, a discharge passage having a narrowed portion, through which the working oil discharged from the mechanical oil pump flows; a connecting passage that connects the intake passage to the discharge passage on an upstream side of the narrowed portion in a flow direction of the working oil while bypassing the mechanical oil pump, and a flow control mechanism including a spool that sets the connecting passage in a communicative state when a differential pressure between an oil pressure on the upstream side of the narrowed portion in the flow direction of the working oil and an oil pressure on a downstream side of the narrowed portion in the flow direction of the working oil exceeds a predetermined value and sets the connecting passage in a non-communicative state when the differential pressure is equal to or lower than the predetermined value. The control method includes detecting an oil temperature of the working oil, calculating an engine torque, setting a line pressure to be higher as the engine torque increases, and raising the line pressure above the set line pressure when the oil temperature is equal to or higher than a predetermined oil temperature at which the connecting passage switches from the communicative state to the non-communicative state due to air mixed into the working oil and the engine torque is equal to or smaller than a predetermined engine torque at which the connecting passage switches from the communicative state to the non-communicative state due to the air mixed into the working oil.

According to these aspects, the flow control mechanism can be operated normally even when air is mixed into the working oil, and therefore a reduction in the discharge pressure of the mechanical oil pump can be suppressed.

According to this invention, a reduction in the discharge pressure of a mechanical oil pump can be suppressed even when air is mixed into working oil.

DESCRIPTION OF THE PREFERRED EMBODIMENTS

A first embodiment of this invention will be described below with reference to the figures.

Figure 1:
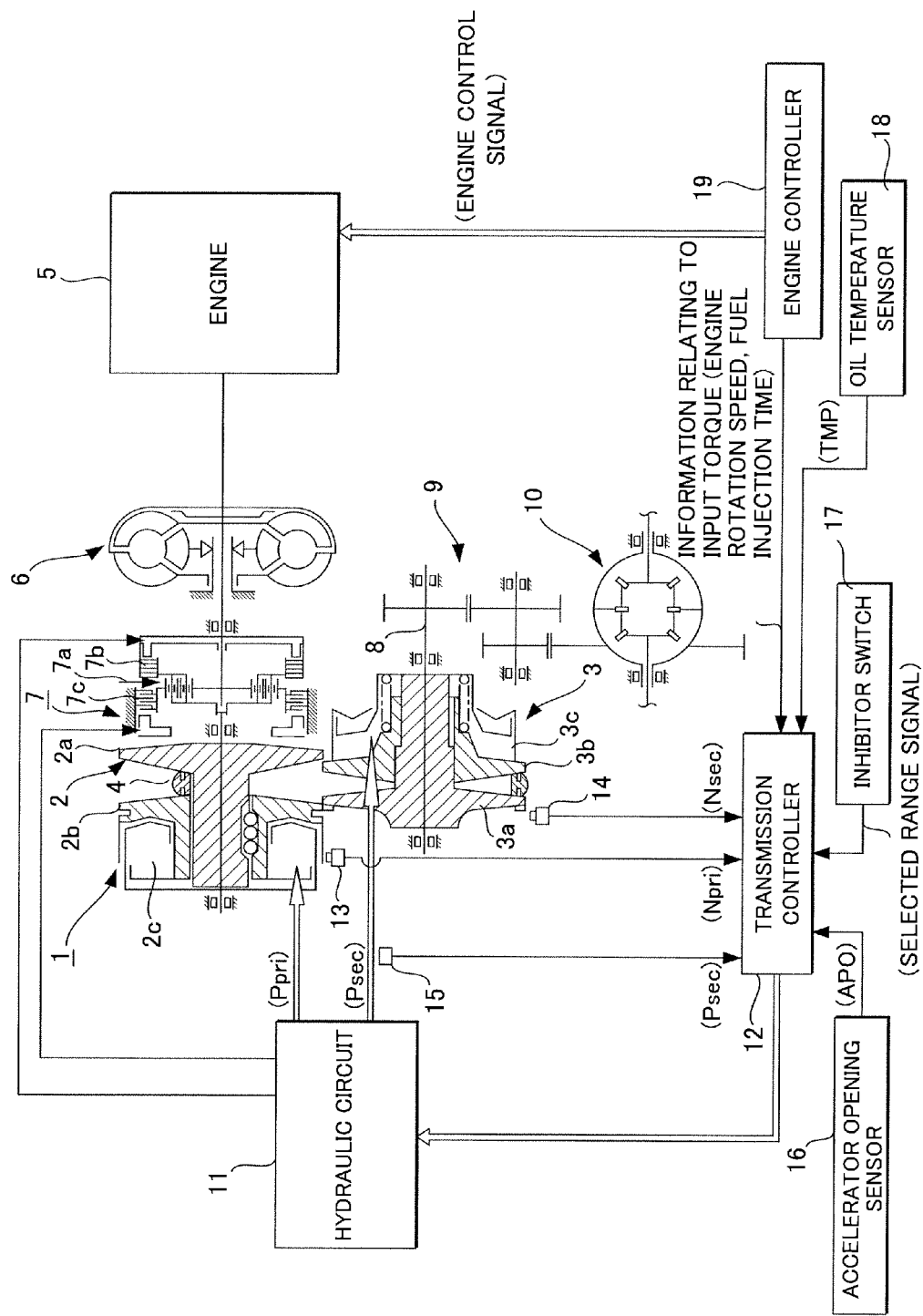
FIG. 1 is a schematic constitutional diagram of a control device for an automatic transmission according to a first embodiment of this invention.

FIG. 1 shows an example of a control device for an automatic transmission according to the first embodiment of this invention. The automatic transmission shown in the figure is a V belt continuously variable transmission 1. In the V belt continuously variable transmission 1, a primary pulley 2 and a secondary pulley 3 are disposed such that respective V grooves thereof are in alignment, and a V belt 4 is wound around the V grooves of the pulleys 2, 3. An engine 5 serving as a drive source is disposed coaxially with the primary pulley 2, and a lockup torque converter 6 and a forward/reverse change-over mechanism 7 are provided between the engine 5 and the primary pulley 2 in sequence from the engine 5 side.

The forward/reverse change-over mechanism 7 has a double pinion planetary gear set 7a as a main constitutional element, a sun gear of which is coupled to the engine 5 via a torque converter 6 and a carrier of which is coupled to the primary pulley 2. The forward/reverse change-over mechanism 7 also includes a forward clutch 7b that directly engages with the sun gear and the carrier of the double pinion planetary gear set 7a and a reverse brake 7c that fixes a ring gear thereof. When the forward clutch 7b is engaged, input rotation passing through the torque converter 6 from the engine 5 is transmitted as is to the primary pulley 2, and when the reverse brake 7c is engaged, the input rotation passing through the torque converter 6 from the engine 5 is transmitted to the primary pulley 2 after being reversed and reduced.

The rotation input into the primary pulley 2 is transmitted to the secondary pulley 3 via the V belt 4, whereupon the rotation of the secondary pulley 3 is transmitted to a vehicle wheel, not shown in the figure, via an output shaft 8, a gear set 9, and a differential device 10. To enable modification of a rotation transmission ratio (a speed change ratio) between the primary pulley 2 and the secondary pulley 3 during the power transmission operation described above, one of the flanges forming the respective V grooves of the primary pulley 2 and the secondary pulley 3 is set as a fixed flange 2a, 3a, and the other flange 2b, 3b is set as a movable flange capable of displacing in an axial direction. The movable flanges 2b, 3b are respectively biased toward the fixed flanges 2a, 3a by supplying a primary pulley pressure Ppri and a secondary pulley pressure Psec, which are created using a line pressure controlled in a manner to be described in detail below as a source pressure, to a primary pulley chamber 2c and a secondary pulley chamber 3c, and as a result, the V belt 4 is frictionally engaged with the pulley flanges, enabling the power transmission described above between the primary pulley 2 and the secondary pulley 3. It should be noted that in this embodiment in particular, the primary pulley chamber 2c and the secondary pulley chamber 3c are set to have an identical pressure-receiving surface area, thereby avoiding a condition in which one of the pulleys 2, 3 increases in diameter, and in so doing, a reduction in the size of the V belt continuously variable transmission is achieved.

During a speed change, a winding arc diameter of the V belt 4 relative to the two pulleys 2, 3 is varied continuously by modifying a V groove width of the pulleys 2, 3 using a differential pressure generated between the primary pulley pressure Ppri and the secondary pulley pressure Psec in accordance with a target speed change ratio, as will be described below, and thus the target speed change ratio can be realized.

Outputs of the primary pulley pressure Ppri and the secondary pulley pressure Psec are controlled by a speed change control hydraulic circuit 11 together with engagement oil pressure outputs from the forward clutch 7b, which is engaged when a forward travel range is selected, and the reverse brake 7c, which is engaged when a reverse travel range is selected, and the speed change control hydraulic circuit 11 performs this control in response to a signal from a transmission controller 12. For this purpose, a signal from a primary pulley rotation sensor 13 that detects a primary pulley rotation speed Npri, a signal from a secondary pulley rotation sensor 14 that detects a secondary pulley rotation speed Nsec, a signal from a secondary pulley pressure sensor 15 that detects the secondary pulley pressure Psec, a signal from an accelerator opening sensor 16 that detects an accelerator pedal depression amount APO, a selected range signal from an inhibitor switch 17, a signal from an oil temperature sensor 18 that detects a speed change working oil temperature TMP, and signals (an engine rotation speed and a fuel injection time) relating to a transmission input torque from an engine controller 19 responsible for controlling the engine 5 are input into the transmission controller 12.

Figure 2:
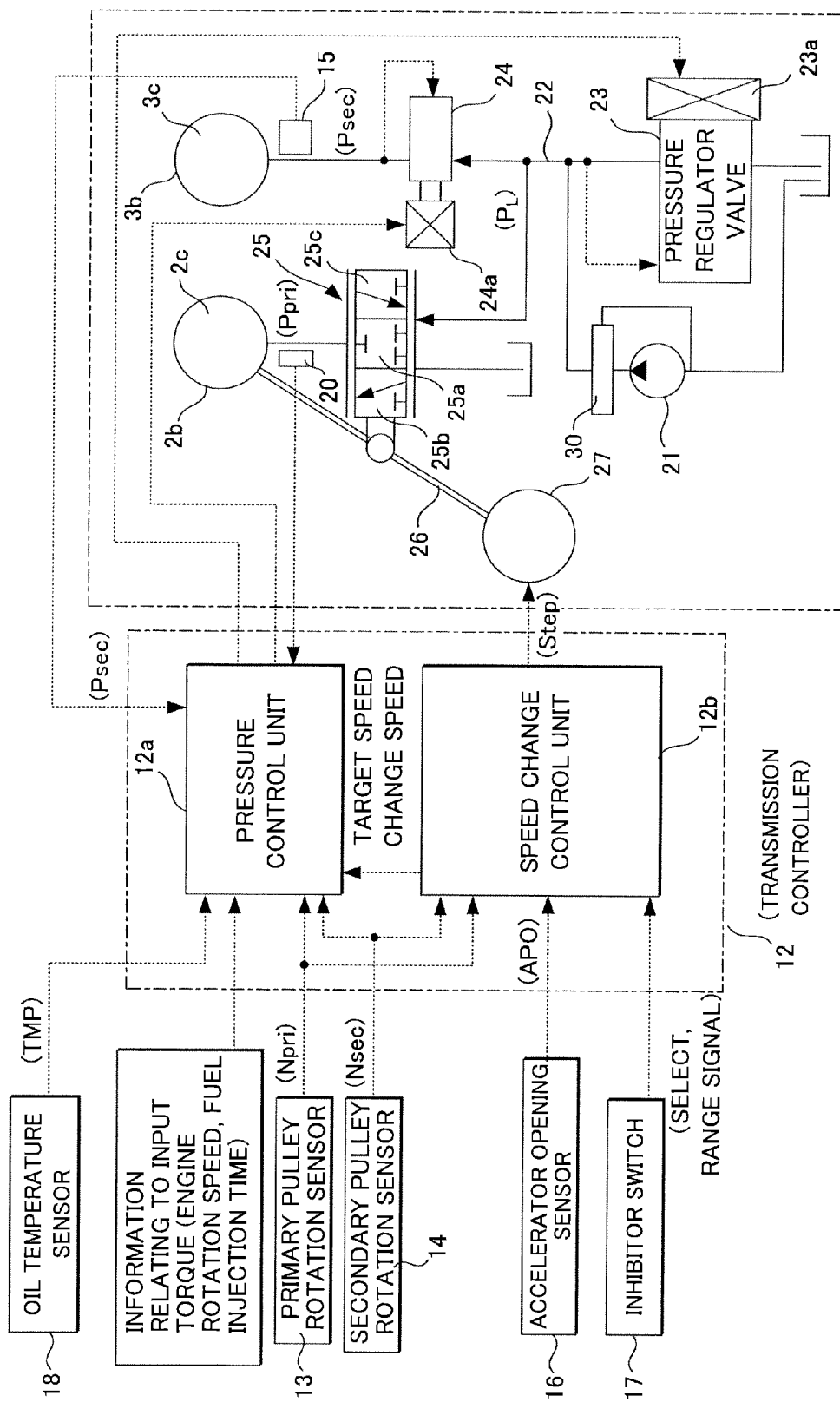
FIG. 2 is a view showing in detail a speed change control hydraulic circuit and a transmission controller provided in the automatic transmission of FIG. 1.

FIG. 2 shows the speed change control hydraulic circuit 11 and the transmission controller 12 of the automatic transmission of FIG. 1 in further detail. First, the speed change control hydraulic circuit 11 will be described. An engine-driven mechanical oil pump 21 is disposed on this circuit.

The mechanical oil pump 21 is provided at a remove from an output shaft of the torque converter 6 in a radial direction, and a first sprocket is attached to a shaft of the mechanical oil pump 21. The first sprocket is connected via a chain to a second sprocket attached to the output shaft of the torque converter 6 such that a rotation of the output shaft of the torque converter 6 is transmitted thereto by the chain. As a result, a drive shaft of the mechanical oil pump 21 rotates such that the mechanical oil pump 21 suctions working oil and discharges high-pressure working oil. A rotation speed of the drive shaft of the mechanical oil pump 21 varies in accordance with a rotation speed of the output shaft of the torque converter 6. When the rotation speed of the output shaft of the torque converter 6 increases, the rotation speed of the drive shaft of the mechanical oil pump 21 increases, leading to a corresponding increase in a discharge pressure of the mechanical oil pump 21.

By disposing the mechanical oil pump 21 at a remove from the output shaft of the torque converter 6 rather than disposing the drive shaft of the mechanical oil pump 21 coaxially with the output shaft of the torque converter 6, a diameter of the drive shaft of the mechanical oil pump 21 can be reduced, enabling a reduction in the size of the mechanical oil pump 21. When the size of the mechanical oil pump 21 is reduced, a reduction in friction occurs, leading to an improvement in efficiency.

Figure 3:
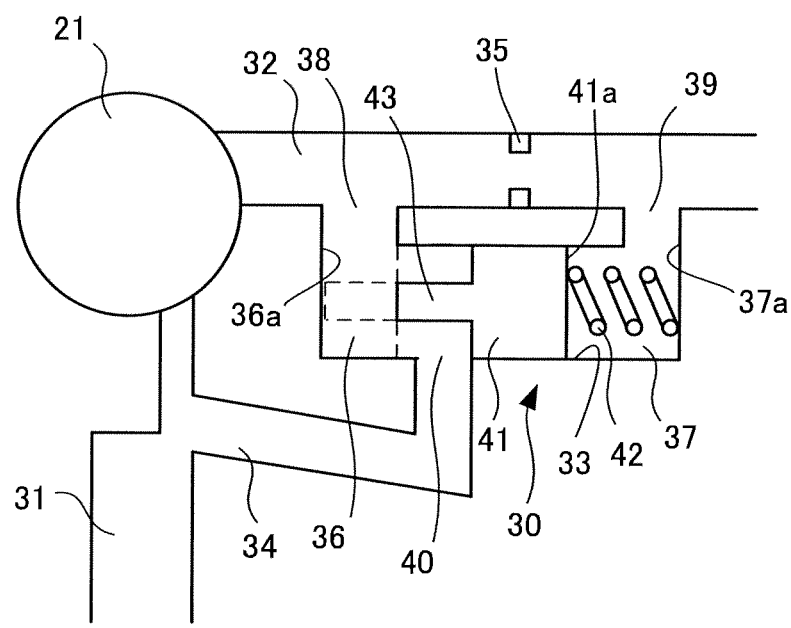
FIG. 3 is a schematic diagram showing a flow control mechanism according to the first embodiment of this invention.

The speed change control hydraulic circuit 11 shown in FIG. 2 is further provided with a flow control mechanism 30. FIG. 3 shows an example of the flow control mechanism 30.

The speed change control hydraulic circuit 11 includes an intake passage 31 through which the working oil suctioned into the mechanical oil pump 21 flows, a discharge passage 32 through which the working oil discharged from the mechanical oil pump 21 flows, a pressure chamber 33 disposed parallel to the discharge passage 32 so as to communicate with the discharge passage 32, and a connecting passage 34 that connects the discharge passage 32 and the intake passage 31 via the pressure chamber 33 while bypassing the mechanical oil pump 21. The flow control mechanism 30 is provided in the pressure chamber 33.

A narrowed portion 35 that projects into the discharge passage 32 from an inner wall of the discharge passage 32 is formed in the discharge passage 32. The narrowed portion 35 reduces a pressure of the working oil discharged from the mechanical oil pump 21. The discharge passage 32 communicates with an oil passage 22.

A first chamber 36 and a second chamber 37 are formed in the pressure chamber 33 by a spool 41 of the flow control mechanism 30. The first chamber 36 is connected to the discharge passage 32 on an upstream side of the narrowed portion 35 in a working oil flow direction by a first connection port 38 such that an oil pressure on the upstream side of the narrowed portion 35 is introduced into the first chamber 36. The second chamber 37 is connected to the discharge passage 32 on a downstream side of the narrowed portion 35 in the working oil flow direction by a second connection port 39 such that an oil pressure on the downstream side of the narrowed portion 35 is introduced into the second chamber 37. Further, an opening portion 40 of the connecting passage 34 is formed in a side face of the first chamber 36.

The flow control mechanism 30 includes the spool 41, which slides along an inner wall of the pressure chamber 33, and a spring 42 that biases the spool 41 such that a volume of the first chamber 36 decreases. The spool 41 includes a stopper 43 that projects into the first chamber 36. One end portion of the spring 42 is attached to an end face 41a of the spool 41 defining the second chamber 37. Another end portion of the spring 42 is attached to a side face 37a of the second chamber 37 facing the end face 41a of the spool 41 that defines the second chamber 37. When the spool 41 is moved by a biasing force of the spring 42, the stopper 43 contacts the side face 36a of the first chamber 36, thereby restricting movement of the spool 41.

The spool 41 is caused to slide along the inner wall of the pressure chamber 33 by a differential pressure between the first chamber 36 and the second chamber 37 and the biasing force of the spring 42. When the differential pressure between the first chamber 36 and the second chamber 37 is comparatively small, the spool 41 is moved to a left side of FIG. 3 by the biasing force of the spring 42, or in other words toward the upstream side. In this case, the spool 41 blocks the opening portion 40 of the connecting passage 34. When the differential pressure between the first chamber 36 and the second chamber 37 increases, the spool 41 moves to a right side of FIG. 3, or in other words toward the downstream side, against the biasing force of the spring 42. As a result, the opening portion 40 of the connecting passage 34 opens onto the first chamber 36.

When the opening portion 40 is not blocked by the spool 41, the connecting passage 34 connects the intake passage 31 to the discharge passage 32 on the upstream side of the narrowed portion 35 via the opening portion 40 and the first chamber 36. It should be noted that the connecting passage 34 preferably communicates with a location close to an intake port of the mechanical oil pump 21. Thus, even when air intermixes with the working oil, the oil pressure of the working oil in the mechanical oil pump 21 increases such that the air is compressed, and as a result, pulsation in the discharge pressure can be suppressed. Further, by returning the working oil returned through the connecting passage 34 to the vicinity of the intake port of the mechanical oil pump 21, the working oil in the connecting passage 34 can be suctioned into the mechanical oil pump 21 without the need for the mechanical oil pump 21 to generate a large suction force. In other words, a high discharge pressure can be obtained without increasing a capacity of the mechanical oil pump 21.

The working oil that is discharged from the mechanical oil pump 21 and transmitted to the oil passage 22 through the discharge passage 32 is regulated to a predetermined line pressure PL by a pressure regulator valve 23. The line pressure PL of the oil passage 22 is, on the one hand, regulated by a pressure reducing valve 24 and supplied to the secondary pulley chamber 3c as the secondary pulley pressure Psec, and on the other hand regulated by a speed change control valve 25 and supplied to the primary pulley chamber 2c as the primary pulley pressure Ppri. It should be noted that the pressure regulator valve 23 controls the line pressure PL through a current applied to a solenoid 23a, while the pressure reducing valve 24 controls the secondary pulley pressure Psec through a current applied to a solenoid 24a. Further, a part of the line pressure PL is supplied to the torque converter 6 and so on via a pressure regulating valve. By throttling the oil pressure supplied to the torque converter 6 and so on even when the discharge pressure of the mechanical oil pump 21 is constant, the line pressure PL can be increased.

The speed change control valve 25 has a neutral position 25a, a pressure increasing position 25b, and a pressure reducing position 25c. To switch these valve positions, the speed change control valve 25 is connected to an intermediate part of a speed change link 26, a step motor 27 serving as a speed change actuator is connected to one end of the speed change link 26, and the movable flange 2b of the secondary pulley is connected to the other end of the speed change link 26. When the step motor 27 is set in an operating position advanced from a reference position by a number of steps Step corresponding to a target speed change ratio and the speed change link 26 rocks using a connection portion with the movable flange 2b as a fulcrum in accordance with the operation of the step motor 27, the speed change control valve 25 is shifted from the neutral position 25a to either the pressure increasing position 25b or the pressure reducing position 25c. Accordingly, the primary pulley pressure Ppri is increased using the line pressure PL as a source pressure or reduced through a drain. As a result, a differential pressure between the primary pulley pressure Ppri and the secondary pulley pressure Psec varies such that an upshift is performed to a Hi side speed change ratio or a downshift is performed to a Lo side speed change ratio, and thus, a speed change operation is performed toward the target speed change ratio.

A progression of the speed change is fed back to a corresponding end of the speed change link 26 via the movable flange 2c of the primary pulley, whereby the speed change link 26 rocks using a connection portion with the step motor 27 as a fulcrum in a direction for returning the speed change control valve 25 from the pressure increasing position 25b or the pressure reducing position 25c to the neutral position 25a. Hence, when the target speed change ratio is achieved, the speed change control valve 25 is returned to the neutral position 25a, and therefore the target speed change ratio can be maintained.

The transmission controller 12 determines the solenoid current of the pressure regulator valve 23, the solenoid current of the pressure reducing valve 24, and a speed change command (the number of steps Step) input into the step motor 27, and performs control for determining whether or not to supply an engagement oil pressure to the forward clutch 7b and the reverse brake 7c shown in FIG. 1. As shown in FIG. 2, the controller 12 is constituted by a pressure control unit 12a and a speed change control unit 12b. The pressure control unit 12a determines the solenoid current of the pressure regulator valve 23 and the solenoid current of the pressure reducing valve 24, while the speed change control unit 12b determines a number of drive steps Astep of the step motor 27 as follows.

First, the speed change control unit 12b determines a target input rotation speed using a vehicle speed, which can be determined from the secondary pulley rotation speed Nsec, and the accelerator pedal depression amount APO on the basis of a planned speed change map, and determines a target speed change ratio corresponding to operating conditions (the vehicle speed and the accelerator pedal depression amount APO) by dividing the target input rotation speed by the secondary pulley rotation speed Nsec. Next, the speed change control unit 12b calculates an actual speed change ratio (an achieved speed change ratio) by dividing the primary pulley rotation speed Npri by the secondary pulley rotation speed Nsec, and determines a speed change ratio command for aligning the actual speed change ratio gradually with the target speed change ratio at a target speed change speed while performing disturbance variable compensation in accordance with a deviation between the target speed change ratio and the actual speed change ratio. The speed change control unit 12b then determines the number of steps (the operating position) Astep of the step motor 27 for realizing the speed change ratio command and notifies the step motor 27 thereof. Thus, the target speed change ratio can be achieved through the speed change operation described above.

It should be noted that the controller 12 is constituted by a CPU, a ROM, a RAM, and so on, and executes oil pressure control and so on by having the CPU read a program stored in the ROM.

Next, an operation of the flow control mechanism 30 will be described in detail.

When the rotation speed of the drive shaft of the mechanical oil pump 21 is low such that a discharge flow rate of the mechanical oil pump 21 is low, a pressure loss generated by the narrowed portion 35 is small, and therefore the differential pressure between the upstream side of the narrowed portion 35 and the downstream side of the narrowed portion 35 is small, leading to a reduction in the differential pressure between the first chamber 36 and the second chamber 37. Accordingly, the spool 41 is moved by the biasing force of the spring 42 so as to reduce the volume of the first chamber 36, while the stopper 43 contacts the end face of the first chamber 36. In this case, the spool 41 blocks the opening portion 40 of the connecting passage 34, and therefore the first chamber 36 does not communicate with the connecting passage 34.

When the rotation speed of the drive shaft of the mechanical oil pump 21 increases, the discharge flow rate of the mechanical oil pump 21 rises, leading to an increase in the differential pressure between the upstream side of the narrowed portion 35 and the downstream side of the narrowed portion 35 and a corresponding increase in the differential pressure between the first chamber 36 and the second chamber 37. Accordingly, the spool 41 moves against the biasing force of the spring 42 so as to increase the volume of the first chamber 36. When the differential pressure between the first chamber 36 and the second chamber 37 increases beyond a predetermined value, the opening portion 40 of the connecting passage 34 opens such that the connecting passage 34 communicates with the first chamber 36. The predetermined value is a preset value at which the opening portion 40 of the connecting passage 34 switches between an open state and a closed state. When the differential pressure between the first chamber 36 and the second chamber 37 is equal to or smaller than the predetermined value, the opening portion 40 of the connecting passage 34 is blocked by the spool 41. When the first chamber 36 communicates with the connecting passage 34, a part of the working oil discharged from the mechanical oil pump 21 at an increased oil pressure is returned to the intake passage 31 of the mechanical oil pump 21. Hence, a high discharge oil pressure can be created using the small mechanical oil pump 21. Further, an intake amount of working oil intermixed with air having low compressibility is reduced, enabling an increase in the discharge pressure of the mechanical oil pump 21.

However, with the mechanical oil pump 21 described above, when an amount of air mixed into working oil suctioned from an oil pan increases, the flow rate of the working oil discharged from the mechanical oil pump 21 decreases, leading to an increase in pulsation in the discharge pressure. Further, a deviation occurs between a phase of an oil pressure pulse in the first chamber 36 and a phase of an oil pressure pulse in the second chamber 37 due to influence from the narrowed portion 35, a first connecting hole, a second connecting hole, and so on. Therefore, when pulsation increases in the discharge pressure, pulsation, which is generated by the differential pressure between the oil pressure in the first chamber 36 and the oil pressure in the second chamber 37, in the pressure chamber 33 increases further.

As a result, despite the differential pressure between the oil pressure in the first chamber 36 and the oil pressure in the second chamber 37 should be kept to be greater than the predetermined value, the differential pressure may be below the predetermined value by the pulsation in the pressure chamber 33. Therefore, spool 41 may continue to block the opining portion 40 without moving to connect the first chamber 36 to the connecting passage 34.

When the spool 41 blocks the opening portion 40, the working oil that is discharged from the mechanical oil pump 21 at a high oil pressure cannot be returned to the mechanical oil pump 21 through the connecting passage 34. Moreover, working oil intermixed with compressed air is not introduced into the mechanical oil pump 21, and therefore the oil pressure of the working oil in the mechanical oil pump 21 decreases, causing the air mixed into the working oil to expand. Accordingly, the discharge pressure of the mechanical oil pump 21 decreases even further, leading to a further reduction in the differential pressure between the first chamber 36 and the second chamber 37 below the predetermined value, and as a result, the spool 41 blocks the opening portion 40 completely. Hence, when air intermixes with the working oil, the discharge pressure of the mechanical oil pump 21 decreases, making it impossible to supply the required oil pressure.

Further, when the amount of air mixed into the working oil increases in a case where the discharge pressure of the mechanical oil pump 21 is high and the opening portion 40 of the connecting passage 34 is open, the flow rate of the working oil discharged from the mechanical oil pump 21 decreases, leading to an increase in pulsation in the discharge pressure. As a result, pulsation in the differential pressure between the first chamber 36 and the second chamber 37 increases such that when the differential pressure between the first chamber 36 and the second chamber 37 is small, the spool 41 is moved by the biasing force of the spring 42, thereby blocking the opening portion 40 of the connecting passage 34. In this case also, the discharge pressure of the mechanical oil pump 21 decreases, making it impossible to supply the required oil pressure.

This phenomenon occurs when the engine rotation speed increases, leading to an increase in the amount of intermixed air, and when the oil temperature increases, leading to deterioration of a defoaming action of a defoamer, for example. The reason for this is that when the engine rotation speed increases, the rotation speed of rotary members that are submerged in the working oil, such as the primary pulley 2, for example, likewise increases, and as a result, the working oil is agitated such that a large amount of air is incorporated. Further, when the oil temperature increases such that the defoaming action of the defoamer deteriorates, the amount of intermixed air remaining in the working oil increases. This phenomenon also occurs when an engine torque decreases such that the line pressure PL is low, for example. The reason for this is that when the line pressure PL decreases, the oil pressure of the discharge passage 32 also decreases, leading to a reduction in the degree by which the air mixed into the working oil in the discharge passage 32 is compressed and a corresponding increase in the proportion of air per unit volume.

When the phenomenon described above occurs in this embodiment, the air mixed into the working oil is compressed by increasing the line pressure PL, thereby suppressing pulsation in the discharge pressure of the mechanical oil pump 21, and as a result, a reduction in the discharge pressure of the mechanical oil pump 21 is suppressed.

Figure 4:
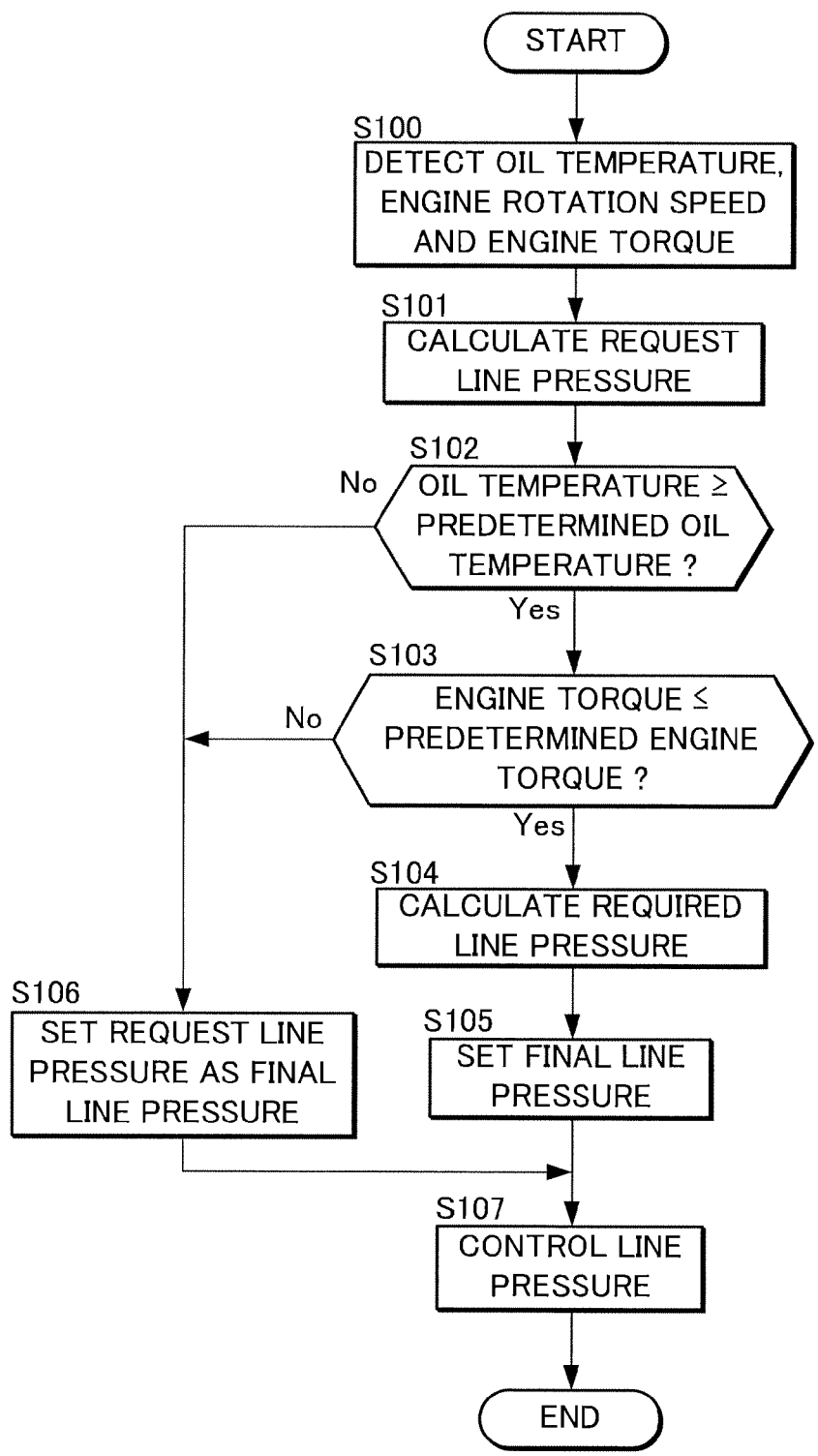
FIG. 4 is a flowchart showing oil pressure control according to the first embodiment of this invention.

Next, oil pressure control according to this embodiment will be described using a flowchart shown in FIG. 4.

In a step S100, the oil temperature is detected by the oil temperature sensor 18 and the engine rotation speed is read from a signal relating to the transmission input torque. Further, the engine torque is calculated on the basis of a signal from the accelerator opening sensor 16.

In a step S101, a requested line pressure is calculated. The requested line pressure is a line pressure required to supply oil pressure to the primary pulley 2 and secondary pulley 3, or a line pressure required to satisfy a torque capacity of the torque converter 6, for example. A line pressure required to suppress slippage of the V belt 4, for example, increases as the engine torque increases. Accordingly, the requested line pressure increases as the engine torque increases.

In a step S102, a determination is made as to whether or not the detected oil temperature is equal to or higher than a predetermined oil temperature. When the detected oil temperature is equal to or higher than the predetermined oil temperature, the routine advances to a step S103. When the detected oil temperature is lower than the predetermined oil temperature, the routine advances to a step S106. The predetermined oil temperature corresponds to an oil temperature at which the spool 41 opens the opening portion 40 of the connecting passage 34 in a case where the amount of air mixed into the working oil increases in accordance with an increase in the oil temperature. In other words, when the oil temperature is lower than the predetermined oil temperature, pulsation in the oil pressure discharged from the mechanical oil pump 21 does not increase, and therefore the opening portion 40 of the connecting passage 34 is not closed by the spool 41 due to pulsation in the oil pressure.

In the step S103, a determination is made as to whether or not the calculated engine torque is equal to or smaller than a predetermined engine torque. When the calculated engine torque is equal to or smaller than the predetermined engine torque, the routine advances to a step S104. When the calculated engine torque is larger than the predetermined engine torque, the routine advances to a step S106. When the engine torque increases, the line pressure PL for suppressing slippage of the V belt 4 increases. Therefore, when the engine torque is large, the oil pressure of the discharge passage 32 increases, thereby ensuring that the air mixed into the working oil is sufficiently compressed, and as a result, pulsation in the discharge pressure can be suppressed. In other words, when the engine torque is small, the oil pressure of the discharge passage 32 decreases, causing the air mixed into the working oil to expand, and as a result, pulsation in the discharge pressure increases. The predetermined engine torque is a torque at which pulsation can no longer be suppressed in a case where the air mixed into the working oil expands as the engine torque decreases. Hence, when the engine torque is larger than the predetermined engine torque, pulsation in the oil pressure discharged from the mechanical oil pump 21 does not increase, and therefore the opening portion 40 of the connecting passage 34 is not closed by the spool 41 due to pulsation in the oil pressure.

It should be noted that here, the determination is made on the basis of the engine torque, but the determination may be made on the basis of an input torque input into the V belt continuously variable transmission 1, an input torque input into the primary pulley, and so on.

In a case where the oil temperature equals or exceeds the predetermined oil temperature but the engine torque is larger than the predetermined engine torque, pulsation in the oil pressure discharged from the mechanical oil pump 21 is suppressed by setting the line pressure PL in accordance with the engine torque, and therefore the opening portion 40 of the connecting passage 34 is not closed by the spool 41 due to pulsation. Further, in a case where the engine torque is equal to or smaller than the predetermined engine torque but the oil temperature is lower than the predetermined oil temperature, the amount of air mixed into the working oil remains low, and therefore pulsation in the oil pressure discharged from the mechanical oil pump 21 is small. Accordingly, the opening portion 40 of the connecting passage 34 is not closed by the spool 41 due to pulsation. Hence, the routine advances to the step S104 only when the oil temperature is equal to or higher than the predetermined oil temperature and the engine torque is equal to or smaller than the predetermined engine torque.

Figure 5:
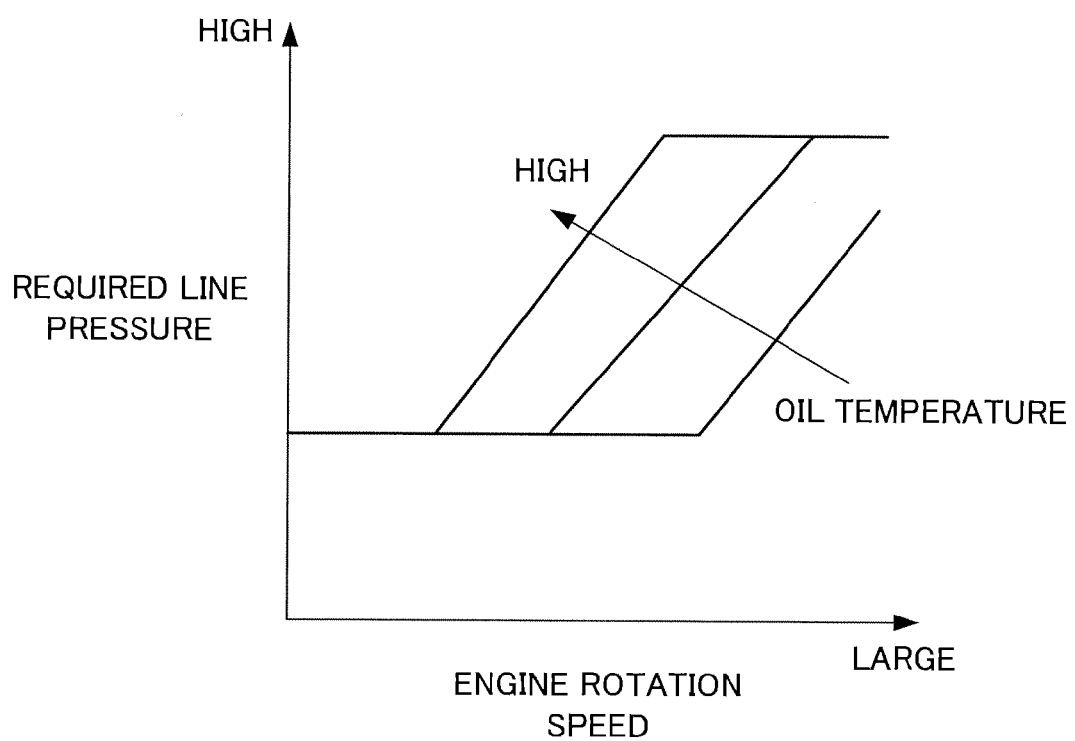
FIG. 5 is a map for calculating a required line pressure according to the first embodiment of this invention.

In the step S104, a required line pressure is calculated from a map shown in FIG. 5 on the basis of the detected oil temperature and the detected engine rotation speed. FIG. 5 is a map showing a relationship between the engine rotation speed, the oil temperature, and the required line pressure. The required line pressure increases as the engine rotation speed rises. Further, an amount of increase in the required line pressure increases as the oil temperature rises.

In a step S105, the requested line pressure calculated in the step S101 and the required line pressure calculated in the step S104 are compared. The higher value thereof is then set as a final line pressure. The line pressure PL is used not only as the oil pressure supplied to the primary pulley 2 and secondary pulley 3, but also to create the torque capacity required by the torque converter 6, for example. Therefore, the final line pressure is set on the basis of a maximum oil pressure for creating the oil pressure required by the V belt continuously variable transmission 1 and the torque converter 6.

When the oil temperature is lower than the predetermined oil temperature or when the engine torque is larger than the predetermined engine torque, the opening portion 40 of the connecting passage 34 is not closed by the spool 41 due to pulsation, and therefore the line pressure calculated in the step S101 is set as the final line pressure in the step S106.

In a step S107, the line pressure is controlled on the basis of the set final line pressure. When the required line pressure is set as the final line pressure, the line pressure is increased by throttling the oil pressure supplied to the torque converter 6 and so on, for example, using the pressure regulator valve 23 and so on, for example. As a result, the oil pressure in the discharge passage 32 of the mechanical oil pump 21 increases, and therefore pulsation in the discharge pressure can be suppressed.

It should be noted that the mechanical oil pump 21 may be constructed as a single unit including the flow control mechanism 30 described above and so on.

Effects of the first embodiment of this invention will now be described.

Figure 6:
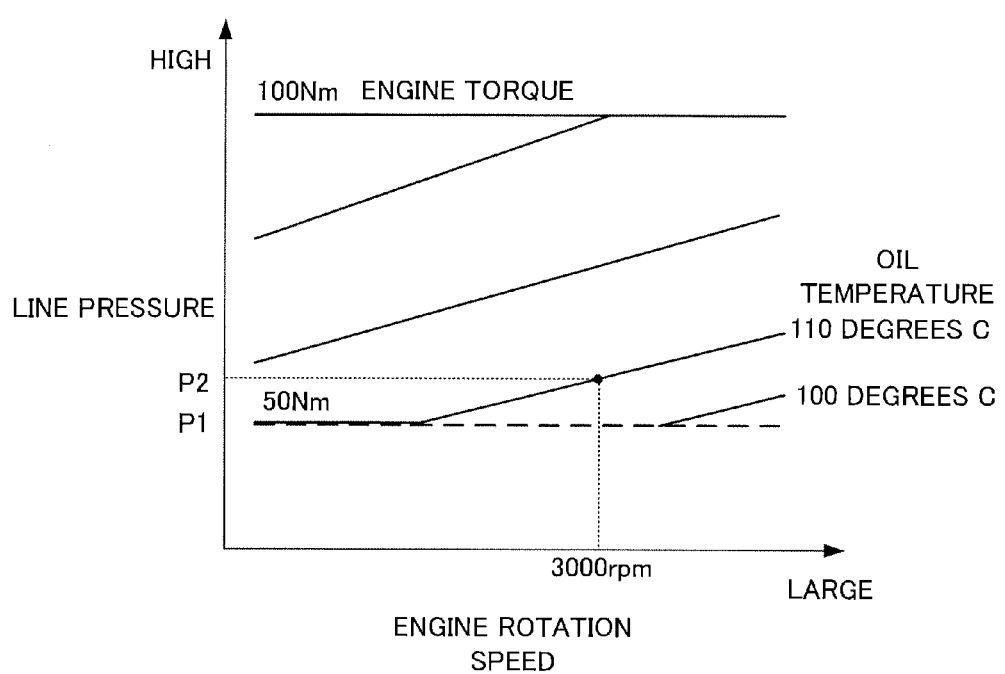
FIG. 6 is a map illustrating the line pressure in a case where the first embodiment of this invention is employed and a case where the first embodiment is not employed.

FIG. 6 shows a line pressure calculated without using this embodiment and the required line pressure calculated using this embodiment. In FIG. 6, the line pressure calculated without using this embodiment is indicated by a broken line, and the required line pressure calculated using this embodiment is indicated by solid lines.

In a case where this embodiment is not used, the line pressure remains at P1 regardless of the oil temperature and the engine rotation speed when the engine torque is 50 Nm, which is smaller than the predetermined engine torque (100 Nm, for example). In a case where this embodiment is used, on the other hand, the required line pressure increases as the engine rotation speed increases when the oil temperature is 110 degrees C., for example, which is higher than the predetermined oil temperature (100 degrees C., for example). Hence, when the engine rotation speed is 3000 rpm, for example, the required line pressure shifts to P2, which is higher than P1.

Therefore, in this embodiment, the required line pressure increases when the engine torque is equal to or smaller than the predetermined engine torque and the oil temperature is equal to or higher than the predetermined oil temperature. Accordingly, the oil pressure of the working oil in the discharge passage 32 increases such that the air contained in the working oil is compressed, and as a result, pulsation in the discharge pressure of the mechanical oil pump 21 can be suppressed. Hence, when the differential pressure between the first chamber 36 and the second chamber 37 increases beyond a predetermined value, the spool 41 operates normally to open the opening portion 40 of the connecting passage 34. Furthermore, a part of the high-oil pressure working oil is returned to the mechanical oil pump 21, and therefore a reduction in the discharge pressure of the mechanical oil pump 21 can be suppressed, meaning that the required oil pressure can be supplied to the V belt continuously variable transmission 1, for example.

Moreover, when the spool 41 is operated normally such that a part of the working oil discharged by the mechanical oil pump 21 is returned to the mechanical oil pump 21, the oil pressure of the working oil in the mechanical oil pump 21 can be increased, and as a result, the air mixed into the working oil in the mechanical oil pump 21 can be compressed. Accordingly, pulsation in the discharge pressure of the mechanical oil pump 21 can be suppressed.

The opening portion 40 of the connecting passage 34 is operated normally even when a large amount of air is contained in the working oil, and therefore the high-oil pressure working oil can be returned to the mechanical oil pump 21 by the flow control mechanism 30 so that a desired discharge pressure can be supplied using the small mechanical oil pump 21. Hence, by employing the small mechanical oil pump 21, the efficiency of the mechanical oil pump 21 can be improved. Furthermore, since the intake amount of working oil intermixed with air having low compressibility is small, the discharge pressure of the mechanical oil pump 21 can be increased.

The line pressure is raised by calculating the required line pressure only in a case where the oil temperature is equal to or higher than the predetermined oil temperature and the engine torque is equal to or smaller than the predetermined engine torque such that pulsation in the discharge pressure of the mechanical oil pump 21 increases. As a result, unnecessary increases in the line pressure, leading to a reduction in fuel efficiency, can be prevented, and therefore the reduction in the size of the mechanical oil pump 21 ultimately leads to an improvement in the fuel efficiency of the vehicle.

By increasing the amount of increase in the required line pressure as the oil temperature rises, pulsation in the discharge pressure of the mechanical oil pump 21 can be suppressed likewise in a case where the amount of air mixed into the working oil increases as the oil temperature rises.

Next, a second embodiment of this invention will be described.

Oil pressure control executed in the second embodiment differs from that of the first embodiment. Here, differences with the first embodiment will be described.

Figure 7:
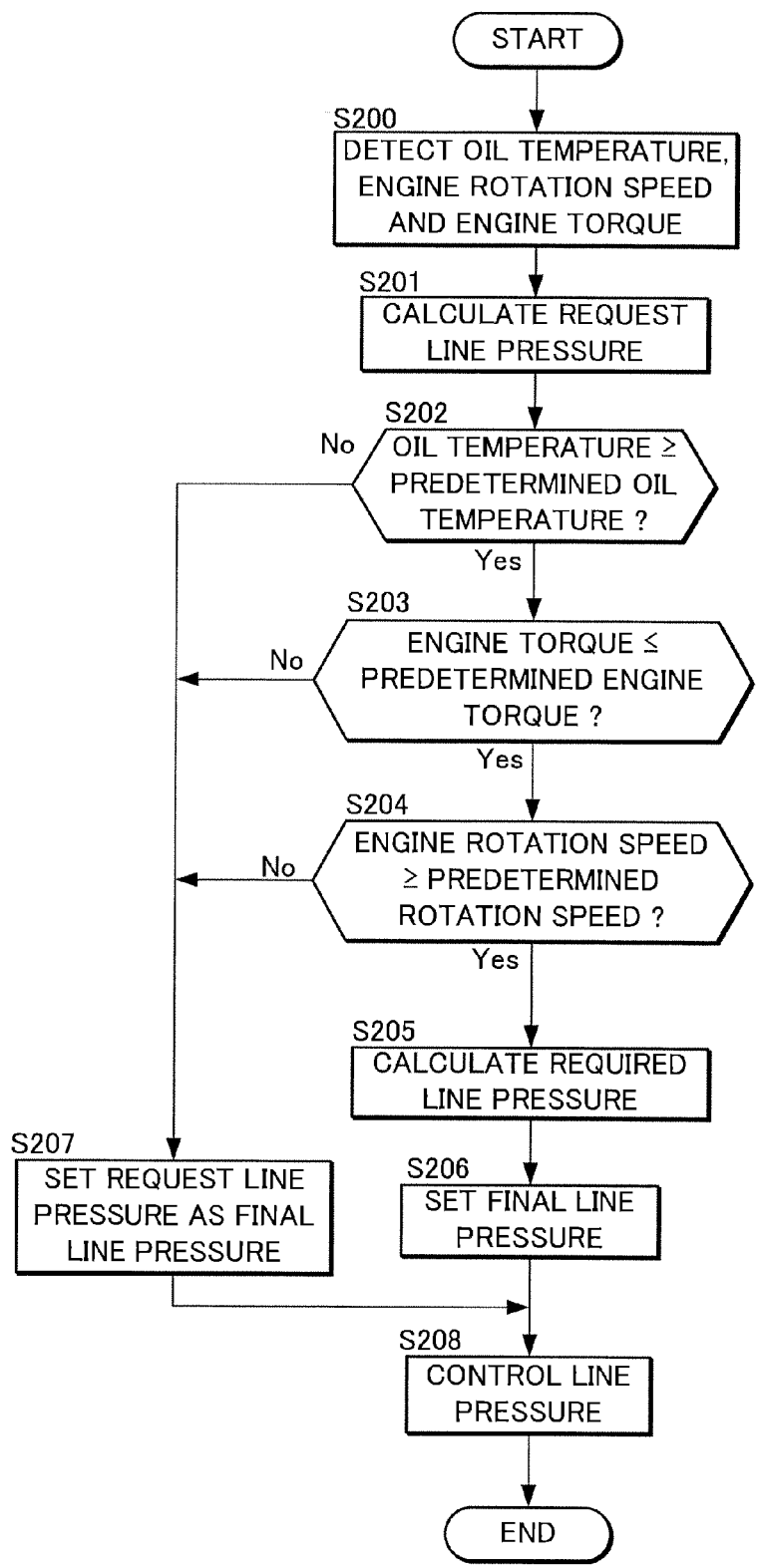
FIG. 7 is a flowchart showing oil pressure control according to a second embodiment of this invention.

The oil pressure control according to this embodiment will be described using FIG. 7.

Control executed from a step S200 to a step S203 is identical to that of the steps S100 to S103 of the first embodiment, and therefore description thereof has been omitted.

In a step S204, a determination is made as to whether or not the engine rotation speed is equal to or higher than a predetermined rotation speed. When the engine rotation speed is equal to or higher than the predetermined rotation speed, the routine advances to a step S205, and when the engine rotation speed is lower than the predetermined rotation speed, the routine advances to a step S207. The predetermined rotation speed is an engine rotation speed at which the differential pressure between the oil pressure of the first chamber 36 and the oil pressure of the second chamber 37 equals or exceeds a predetermined value. The rotation of the engine is transmitted to the mechanical oil pump 21 via the first sprocket, the second sprocket, and so on. Therefore, when the engine rotation speed increases, the rotation speed of the drive shaft of the mechanical oil pump 21 also increases, leading to an increase in the discharge flow rate of the mechanical oil pump 21. When the engine rotation speed equals or exceeds the predetermined rotation speed, the differential pressure between the oil pressure of the first chamber 36 and the oil pressure of the second chamber 37 equals or exceeds the predetermined value, and as a result, the opening portion 40 of the connecting passage 34 is opened. When the engine rotation speed is lower than the predetermined rotation speed, on the other hand, the opening portion 40 of the connecting passage 34 is blocked by the spool 41.

It should be noted that here, the determination is made on the basis of the engine rotation speed, but this embodiment is not limited thereto, and the determination may be made on the basis of the rotation speed of the output shaft of the torque converter 6 and so on.

Control executed from a step S205 to a step S208 is identical to that of the steps S104 to S107 of the first embodiment, and therefore description thereof has been omitted.

Effects of the second embodiment of this invention will now be described.

Figure 8:
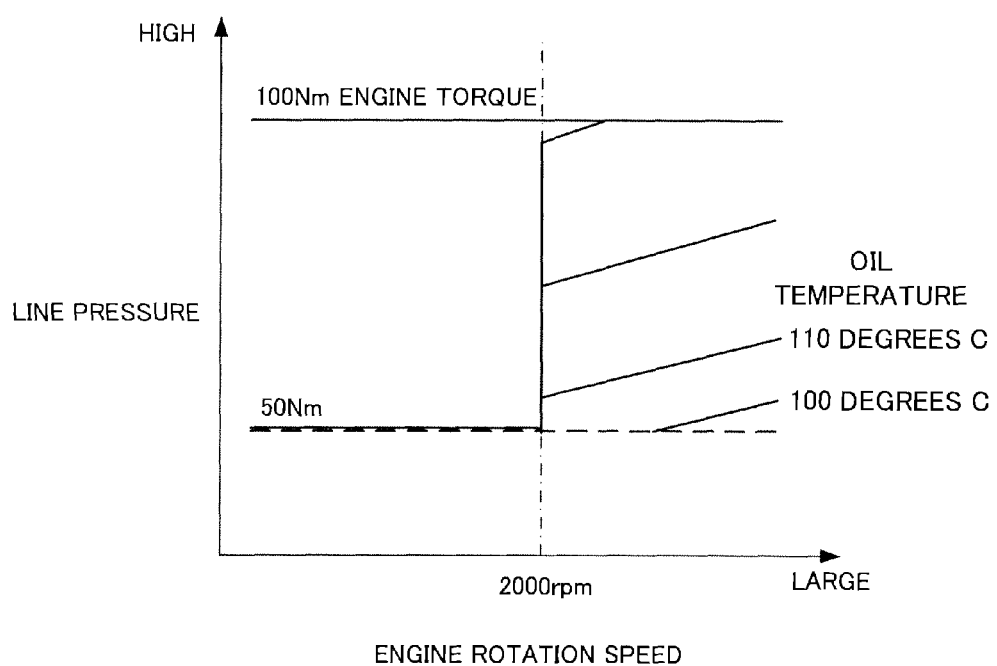
FIG. 8 is a map illustrating the line pressure in a case where the second embodiment of this invention is employed.

In a case where this embodiment is employed, as shown in FIG. 8, the required line pressure is not calculated when the engine rotation speed is lower than the predetermined rotation speed (2000 rpm, for example). When the engine rotation speed is lower than the predetermined rotation speed, the differential pressure between the oil pressure of the first chamber 36 and the oil pressure of the second chamber 37 does not exceed the predetermined value, and therefore the opening portion 40 of the connecting passage 34 is blocked by the spool 41. In this case, the required line pressure is not calculated. As a result, unnecessary increases in the line pressure can be prevented, enabling an improvement in fuel efficiency.

This invention is not limited to the embodiments described above and is intended to include various modifications and amendments that can be made within the scope of the technical spirit thereof.

This application claims priority from Japanese Patent Application No. 2010-64661, filed Mar. 19, 2010, which is incorporated herein by reference in its entirety.

What is claimed is:

1. An automatic transmission comprising:
a mechanical oil pump configured to be driven by a rotation of an engine transmitted thereto;
an intake passage through which a working oil suctioned into the mechanical oil pump flows;
a discharge passage having a narrowed portion, through which the working oil discharged from the mechanical oil pump flows;
a connecting passage that connects the intake passage to the discharge passage on an upstream side of the narrowed portion in a flow direction of the working oil while bypassing the mechanical oil pump;
a flow control mechanism including a spool that is configured to set the connecting passage in a communicative state when a differential pressure between an oil pressure on the upstream side of the narrowed portion in the flow direction of the working oil and an oil pressure on a downstream side of the narrowed portion in the flow direction of the working oil exceeds a predetermined value, and is configured to set the connecting passage in a non-communicative state when the differential pressure is equal to or lower than the predetermined value; and
a control device comprising:
an oil temperature detecting unit configured to detect an oil temperature of the working oil;
an engine torque calculating unit configured to calculate an engine torque;
a line pressure setting unit configured to set a line pressure to be higher as the engine torque increases;
a determining unit configured to determine whether the oil temperature is equal to or higher than a predetermined oil temperature at which the connecting passage switches from the communicative state to the non-communicative state due to air mixed into the working oil and whether the engine torque is equal to or smaller than a predetermined engine torque at which the connecting passage switches from the communicative state to the non-communicative state due to the air mixed into the working oil; and
a line pressure correcting unit configured to raise the line pressure above the line pressure set by the line pressure setting unit when the determining unit determines that the oil temperature is equal to or higher than the predetermined oil temperature and the engine torque is equal to or smaller than the predetermined engine torque.

2. The automatic transmission as defined in claim 1, wherein the line pressure correcting unit is configured to increase the line pressure when a rotation speed of the engine is equal to or higher than a predetermined rotation speed at which the differential pressure exceeds the predetermined value.

3. The automatic transmission as defined in claim 1, wherein the line pressure correcting unit is configured to increase an amount of line pressure as the oil temperature rises.

4. A control method for an automatic transmission comprising a controller, comprising:
controlling, by the controller, the automatic transmission, wherein the automatic transmission further comprises:
a mechanical oil pump driven by a rotation of an engine transmitted thereto; an intake passage through which a working oil suctioned into the mechanical oil pump flows; a discharge passage having a narrowed portion, through which the working oil discharged from the mechanical oil pump flows;
a connecting passage that connects the intake passage to the discharge passage on an upstream side of the narrowed portion in a flow direction of the working oil while bypassing the mechanical oil pump; and
a flow control mechanism including a spool that sets the connecting passage in a communicative state when a differential pressure between an oil pressure on the upstream side of the narrowed portion in the flow direction of the working oil and an oil pressure on a downstream side of the narrowed portion in the flow direction of the working oil exceeds a predetermined value, and sets the connecting passage in a non-communicative state when the differential pressure is equal to or lower than the predetermined value;
detecting, by the controller, an oil temperature of the working oil;
calculating, by the controller, an engine torque;
setting, by the controller, a line pressure to be higher as the engine torque increases;
determining, by the controller, whether the oil temperature is equal to or higher than a predetermined oil temperature at which the connecting passage switches from the communicative state to the non-communicative state due to air mixed into the working oil and whether the engine torque is equal to or smaller than a predetermined engine torque at which the connecting passage switches from the communicative state to the non-communicative state due to the air mixed into the working oil; and
raising, by the controller, the line pressure above the set line pressure upon determination that the oil temperature is equal to or higher than the predetermined oil temperature and the engine torque is equal to or smaller than the predetermined engine.

5. The control method for the automatic transmission as defined in claim 4, wherein the line pressure is raised when a rotation speed of the engine is equal to or higher than a predetermined rotation speed at which the differential pressure exceeds the predetermined value.

6. The control method for the automatic transmission as defined in claim 4, wherein an amount of line pressure increases as the oil temperature rises.

7. A device for an automatic transmission, comprising:
- a mechanical oil pump driven by a rotation of an engine transmitted thereto;
- an intake passage through which a working oil suctioned into the mechanical oil pump flows;
- a discharge passage having a narrowed portion, through which the working oil discharged from the mechanical oil pump flows;
- a connecting passage that connects the intake passage to the discharge passage on an upstream side of the narrowed portion in a flow direction of the working oil while bypassing the mechanical oil pump;
- a flow control mechanism including a spool that sets the connecting passage in a communicative state when a differential pressure between an oil pressure on the upstream side of the narrowed portion in the flow direction of the working oil and an oil pressure on a downstream side of the narrowed portion in the flow direction of the working oil exceeds a predetermined value, and sets the connecting passage in a non-communicative state when the differential pressure is equal to or lower than the predetermined value;
- oil temperature detecting means for detecting an oil temperature of the working oil;
- engine torque calculating means for calculating an engine torque;
- line pressure setting means for setting a line pressure to be higher as the engine torque increases;
- determining means for determining whether the oil temperature is equal to or higher than a predetermined oil temperature at which the connecting passage switches from the communicative state to the non-communicative state due to air mixed into the working oil and whether the engine torque is equal to or smaller than a predetermined engine torque at which the connecting passage switches from the communicative state to the non-communicative state due to the air mixed into the working oil; and
- line pressure correcting means for raising the line pressure above the line pressure set by the line pressure setting means when the determining means determines that the oil temperature is equal to or higher than the predetermined oil temperature and the engine torque is equal to or smaller than the predetermined engine torque.

8. The device for the automatic transmission as defined in claim 7, wherein the line pressure correcting means increases the line pressure when a rotation speed of the engine is equal to or higher than a predetermined rotation speed at which the differential pressure exceeds the predetermined value.

9. The device for the automatic transmission as defined in claim 7, wherein the line pressure correcting means increases an amount of line pressure as the oil temperature rises.

* * * * *